US007895265B2

(12) United States Patent
Deguchi (10) Patent No.: US 7,895,265 B2
(45) Date of Patent: Feb. 22, 2011

(54) METHOD AND SYSTEM FOR IDENTIFYING A TIME SPECIFIC EVENT (75) Inventor: Yuichiro Deguchi, San Mateo, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1116 days.

(21) Appl. No.: 11/410,541

(22) Filed: Apr. 24, 2006

(65) Prior Publication Data

US 2006/0212508 A1 Sep. 21, 2006

Related U.S. Application Data (63) Continuation of application No. 09/905,355, filed on Jul. 13, 2001, now Pat. No. 7,062,528.

(60) Provisional application No. 60/218,416, filed on Jul. 14, 2000.

(51) Int. Cl.
*G06F 15/16* (2006.01)
(52) U.S. Cl. ........................ 709/203; 709/219
(58) Field of Classification Search ................ 709/203, 709/217, 219, 248; 713/400, 401; 702/176–178
See application file for complete search history.

(56) References Cited

U.S. PATENT DOCUMENTS

| | | | |
|---|---|---|---|
| 3,836,842 A | 9/1974 | Zimmermann et al. | |
| 5,199,009 A | 3/1993 | Svast | |
| 5,297,118 A | 3/1994 | Sakumoto | |
| 5,508,978 A | 4/1996 | Kalbermatter et al. | |
| 5,579,472 A | 11/1996 | Keyworth, II et al. | |
| 5,689,688 A * | 11/1997 | Strong et al. | 713/375 |
| 5,758,257 A | 5/1998 | Herz et al. | |
| 5,850,218 A | 12/1998 | Lajoie et al. | |
| 5,889,737 A | 3/1999 | Alameh et al. | |
| 5,907,685 A * | 5/1999 | Douceur | 709/248 |
| 5,915,288 A | 6/1999 | Gabriel | |
| 5,968,133 A * | 10/1999 | Latham et al. | 709/248 |
| 6,088,021 A | 7/2000 | Young | |
| 6,100,884 A | 8/2000 | Tomita et al. | |
| 6,104,334 A | 8/2000 | Allport | |
| 6,128,009 A | 10/2000 | Ohkura et al. | |
| 6,144,864 A | 11/2000 | Lands et al. | |
| 6,148,261 A | 11/2000 | Obradovich et al. | |

(Continued)

OTHER PUBLICATIONS

Ludovic Rousseau, "Secure Time in a Portable Device", 2001, In Proc. of Gemplus Developer Conference, Paris, France, Jun. 20-21, 2001.*

(Continued)

*Primary Examiner*—Aaron Strange
(74) *Attorney, Agent, or Firm*—John P. O'Banion (57) ABSTRACT

Method and system for providing a compact, portable electronic devices capable of storing data related to time specific events such as music broadcasts, television broadcasts and advertisements, and which are capable of recalling the stored time specific events to provide users with information corresponding to the stored time specific events such as the name of the music broadcast, artist and album information for the broadcast music, name of the television program broadcast, or the product or service information corresponding to the advertisements is provided.

40 Claims, 7 Drawing Sheets

U.S. PATENT DOCUMENTS

| | | | |
|---|---|---|---|
| 6,158,884 A | 12/2000 | Lebby et al. | |
| 6,169,498 B1 | 1/2001 | King et al. | |
| 6,199,125 B1 | 3/2001 | Cortesi et al. | |
| 6,216,230 B1 | 4/2001 | Rallis et al. | |
| 6,230,172 B1 | 5/2001 | Purneveja et al. | |
| 6,263,438 B1 * | 7/2001 | Walker et al. | 713/178 |
| 6,272,545 B1 * | 8/2001 | Flanagin et al. | 709/228 |
| 6,289,346 B1 | 9/2001 | Milewski et al. | |
| 6,290,517 B1 | 9/2001 | Anderson | |
| 6,304,249 B1 | 10/2001 | Derocher et al. | |
| 6,323,783 B1 | 11/2001 | Lizzi | |
| 6,330,490 B1 | 12/2001 | Kin et al. | |
| 6,353,398 B1 | 3/2002 | Amin et al. | |
| 6,356,971 B1 | 3/2002 | Katz et al. | |
| 6,360,209 B1 | 3/2002 | Loeb et al. | |
| 6,392,635 B1 | 5/2002 | Snyder | |
| 6,425,081 B1 | 7/2002 | Iwamura | |
| 6,427,175 B1 | 7/2002 | Khan et al. | |
| 6,438,751 B1 * | 8/2002 | Voyticky et al. | 725/42 |
| 6,493,702 B1 | 12/2002 | Adar et al. | |
| 6,507,727 B1 | 1/2003 | Henrick | |
| 6,515,595 B1 | 2/2003 | Obradovich et al. | |
| 6,556,513 B2 | 4/2003 | Wimberly | |
| 6,559,773 B1 | 5/2003 | Berry | |
| 6,571,577 B2 | 6/2003 | Radley-Smith | |
| 6,578,047 B1 | 6/2003 | Deguchi | |
| 6,637,028 B1 * | 10/2003 | Voyticky et al. | 725/42 |
| 6,650,534 B2 | 11/2003 | Tree | |
| 6,650,877 B1 * | 11/2003 | Tarbouriech et al. | 455/186.1 |
| 6,674,993 B1 * | 1/2004 | Tarbouriech | 455/2.01 |
| 6,680,714 B2 | 1/2004 | Wilmore | |
| 6,763,371 B1 * | 7/2004 | Jandel | 709/204 |
| 2001/0019618 A1 | 9/2001 | Rhoads | |
| 2001/0020239 A1 | 9/2001 | Ukigawa | |
| 2001/0034219 A1 | 10/2001 | Hewitt et al. | |
| 2001/0040977 A1 | 11/2001 | Nakano | |
| 2001/0051996 A1 | 12/2001 | Cooper et al. | |
| 2002/0007354 A1 | 1/2002 | Deguchi | |
| 2002/0023272 A1 | 2/2002 | Pocock | |
| 2002/0032019 A1 | 3/2002 | Marks et al. | |
| 2002/0032698 A1 * | 3/2002 | Cox | 707/501.1 |
| 2002/0056084 A1 | 5/2002 | Harris et al. | |
| 2002/0068991 A1 | 6/2002 | Fitzsimmons | |
| 2002/0120850 A1 * | 8/2002 | Walker et al. | 713/178 |
| 2002/0162009 A1 | 10/2002 | Shmueli et al. | |
| 2002/0164973 A1 | 11/2002 | Janik et al. | |
| 2002/0174372 A1 | 11/2002 | Venkataraman | |
| 2002/0174431 A1 * | 11/2002 | Bowman et al. | 725/47 |
| 2002/0186886 A1 | 12/2002 | Rhoads | |
| 2003/0005433 A1 * | 1/2003 | Janik et al. | 725/18 |
| 2003/0012403 A1 | 1/2003 | Rhoads et al. | |
| 2003/0023421 A1 | 1/2003 | Finn et al. | |
| 2003/0027634 A1 | 2/2003 | Matthews, III | |
| 2003/0097351 A1 | 5/2003 | Rothschild et al. | |
| 2003/0103645 A1 | 6/2003 | Levy et al. | |
| 2003/0174167 A1 | 9/2003 | Poo et al. | |
| 2003/0217206 A1 | 11/2003 | Poo | |
| 2004/0171377 A1 | 9/2004 | Engstrom | |
| 2004/0203729 A1 | 10/2004 | Makipaa et al. | |

OTHER PUBLICATIONS

Leslie Lamport, "Time, Clocks, and the Ordering of Events in a Distributed System", 1978, Communications of the ACM, Jul. 1978, vol. 21, No. 7.*

M. Doyle and P. Cunningham, "On balancing client-server load in intelligent web-based applications involving dialog", 1999, Technical Report TCD-CS-1999-25, Trinity College Dublin.*

Ludovic Rousseau, "Secure time in a portable device," in Proc. of Gemplus Developer Conference, Paris, France, Jun. 20-21, 2001.

Leslie Lamport, "Time, clocks, and the ordering of events in a distributed system," Communications of the ACM, vol. 21, No. 7, Jul. 1978.

M. Doyle; P. Cunningham, On balancing client-server load in intelligent web-based applications involving dialog, Technical Report TCD-CS-1999-25, Trinity College Dublin, 1999.

* cited by examiner

METHOD AND SYSTEM FOR IDENTIFYING A TIME SPECIFIC EVENT

RELATED APPLICATION

This application is a continuation of U.S. patent application Ser. No. 09/905,355 filed on Jul. 13, 2001, now U.S. Pat. No. 7,062,528, which claims priority to U.S. application Ser. No. 60/218,416 filed on Jul. 14, 2000, which is herein incorporated by reference.

FIELD OF THE INVENTION

The present invention relates to portable electronic devices including electronic data marker devices. More particularly, the present invention relates to a method and system for identifying time specific events using portable electronic devices to record and later recall information corresponding to the identified time specific events.

BACKGROUND OF THE INVENTION

With increases in portable electronic devices such as personal digital assistants (PDAs) and WAP (Wireless Application Protocol) enabled mobile telephones, there has been a steady increase in these devices capable of performing more operations. Indeed, each generation of portable electronic devices generally follows a more physically compact design with increased functionality.

As more devices become available to consumers, functionality as well as the size of the devices plays a significant role in capturing the market share for a particular device. For example, without any doubt, the space around one's key chain is considered valuable, with many retailers and vendors of goods and services vying for a consumer's key chain space. For instance, movie video rental retailers recently began issuing a miniaturized credit card like plastic which typically includes a bar code with the user's account information. Given the size, consumers readily find a place for such items in the consumer's key chain.

In view of the foregoing, it would be desirable to have a portable electronic device which is capable of storing data related to time specific events, and which is capable of recalling the stored time specific events for the user of the device and further, where the device is compact and easily accessible to the user, for example, which can easily fit around the user's key chain.

SUMMARY OF THE INVENTION

In one embodiment, a system for identifying a time specific event includes a data marker device configured to store one or more time stamps and a device identification code, a server terminal configured to generate a reference time information, and a user terminal configured to receive the one or more time stamps and the device identification code from the data marker device, and to receive the reference time information from the server terminal, the user terminal further configured to determine a time information corresponding to the each one or more time stamps.

A system for identifying a time specific event in accordance with another embodiment includes a data marker device configured to store one or more time stamps, each of the one or more time stamps generated responsive to a user input operation, and a device identification code, a data network, a server terminal coupled to the data network configured to generate a reference time information, a user terminal coupled to the data network configured to receive the one or more time stamps and the device identification code from the data marker device, and further, to receive the reference time information from the server terminal, where the reference time information substantially corresponds to a time point when the data marker device establishes connection with the user terminal.

A method in accordance with yet another embodiment includes receiving one or more time stamps, receiving a data marker device identification code, transmitting a request for a reference time information, receiving the reference time information based on the transmitting step, determining a time information corresponding to each of the one or more time stamps, and transmitting data including the one or more time stamps, the data marker device identification code, the reference time information, and the time information corresponding to each of the one or more time stamps.

A system for identifying a time specific event in accordance with still another embodiment includes means for storing one or more time stamps and a device identification code, means for generating a reference time information, means for receiving the one or more time stamps and the device identification code, and the reference time information, and means for determining a time information corresponding to the each one or more time stamps.

These and other features and advantages of the present invention will be understood upon consideration of the following detailed description of the invention and the accompanying drawings.

DETAILED DESCRIPTION

Figure 1:
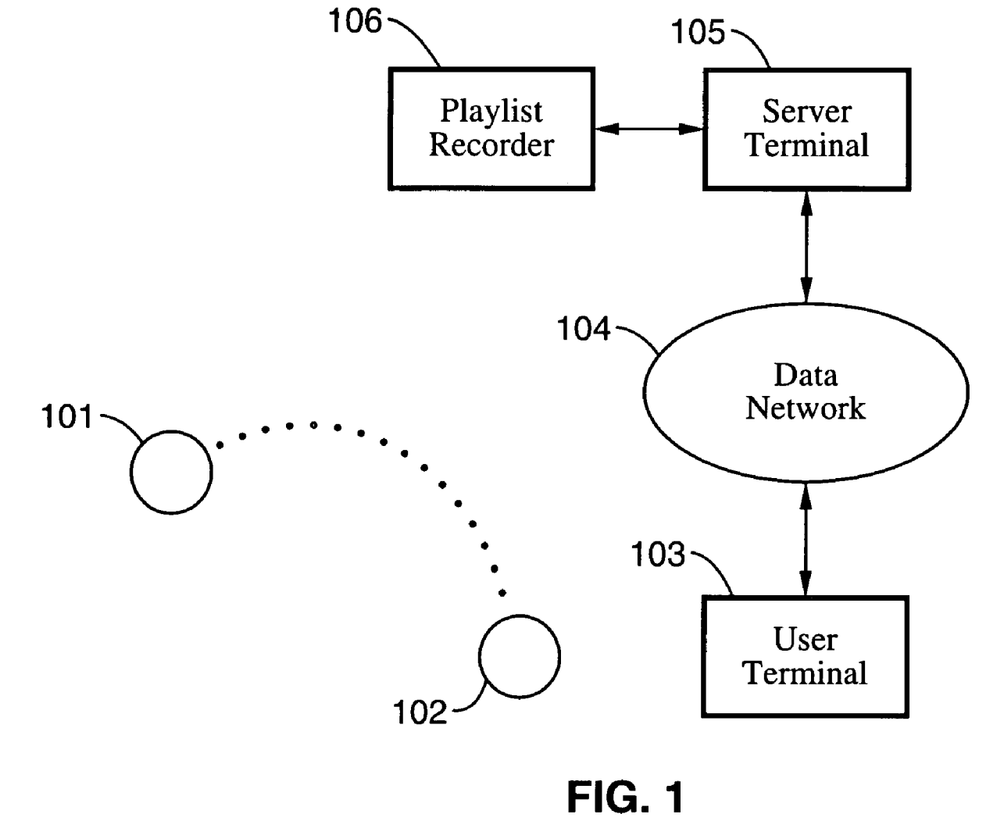
FIG. 1 illustrates an overall system for identifying a time specific event in one embodiment.

FIG. 1 illustrates an overall system for identifying a time specific event in one embodiment. Referring to FIG. 1, overall system 100 includes user terminal 103 connected to data network 104 such as the internet via connection protocols such as TCP/IP, Appletalk, using connection interface unit (not shown) such as a dial-up modem through an internet service provider (ISP), a broadband network such as a DSL or cable modem, a T1 or LAN connection, or any other means for connecting to the internet. User terminal 103 is configured to connect to electronic data marker device 101 via cradle type connection unit 102, and configured to receive, upon synchronization operation with data marker device 101, bookmark information stored in data marker device 101. In one embodiment, the bookmark information transmitted from data marker device 101 to user terminal 103 may include data marker device 101 unique device identification code, the number of stored bookmarks, and corresponding date and time stamp for each of the stored bookmarks.

Also shown in FIG. 1 is server terminal 105 connected to data network 104 for communicating with user terminals 103 for data transfer. Moreover, as further shown in FIG. 1, in one aspect, for bookmarking broadcast music clips using data marker 101, playlist provider 106 is provided to communicate with server terminal 105. Playlist provider 106 may be configured to transmit playlist information corresponding to registered radio station broadcasts such as the title, artist and album information for the music broadcast from the registered radio station.

Indeed, in one aspect, playlist provider 106 may be configured to periodically transmit information related to the music broadcast from the registered radio stations over a predetermined period of time. For example, depending upon factors such as the target market for the registered radio station or the geographic location of the registered radio station, playlist provider 106 may be configured to transmit broadcast music clip information to server terminal 105 within ten minutes from the termination of the respective music broadcast, or alternatively, within 12 or 24 hours from a predetermined broadcast cutoff time such as 10 PM or midnight. Moreover, while playlist provider 106 is shown as communicating with server terminal 105 via a dedicated connection, within the scope of the present invention, server terminal 105 and playlist provider 106 may communicate via a connection through data network 104 for data transfer.

Figure 2:
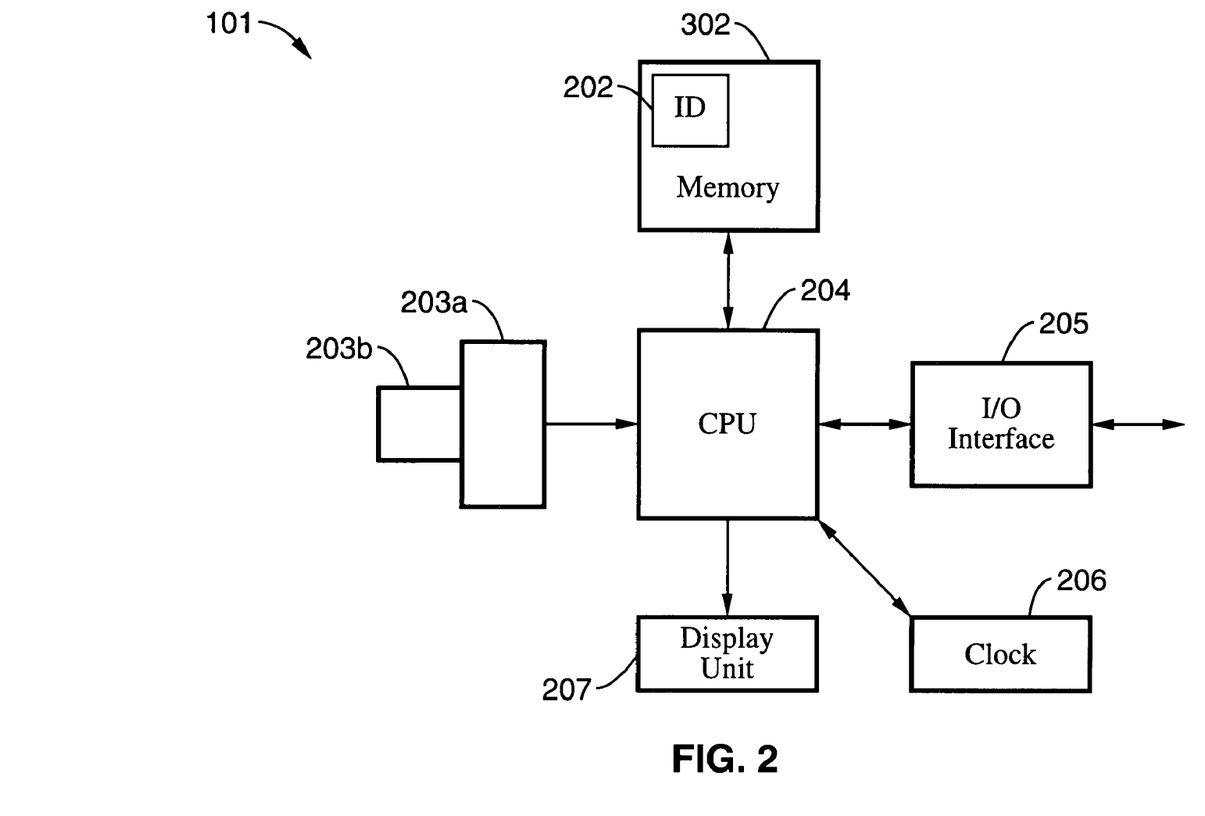
FIG. 2 illustrates a block diagram of the electronic data marker device shown in FIG. 1.

FIG. 2 illustrates a block diagram of the electronic data marker device shown in FIG. 1. Referring to FIG. 2, data marker device 101 includes memory 201 such as a Random Access Memory (RAM) and a Read-Only Memory (ROM), and stored thereon is a unique bookmarking device identification code 202 which can include a predetermined combination of letters or numbers, or a combination of both. In one embodiment, identification code 202 can include a thirteen-digit number which is unique to each bookmarking device and is pre-stored in the ROM portion of memory 201.

Further shown in FIG. 2 is controller (CPU) 204 which is configured to control the various components of bookmarking device 101 as shown such as display unit 207, input units 203a, 203b such as bookmarking buttons for bookmarking broadcast music clips over a registered radio or television station, or for bookmarking locations, input/output (I/O) interface 205, clock/timer 206, and memory 201. As can be seen from FIG. 2, upon receiving an input signal from a user of data marker device 101 via input units 203a, 203b, controller 204 may be configured to access the various components of device 101 depending upon the input command received from the user, to perform one or a plurality of processings, executing the input command of the user.

Moreover, I/O interface 205 of data marker device 101 shown in FIG. 2 may be configured to, under the control of controller 204, interface with server terminal 105. Display unit 207 in accordance with one embodiment of the present invention may include a liquid crystal display (LCD), a plasma-type display, and the like, configured to display text or image data, or a combined text and image data. Furthermore, as discussed above, the input unit 203a, 203b may include spring-loaded type input buttons for operation by the user's finger. Alternatively, input unit 203a, 203b may include a touchpad-type screen integrated with display unit 207 for simultaneously inputting and displaying information, where the user can tap the pressure-sensitive screen using a stylus or the like to enter input commands. Timer/clock 206 of data marker device 101 in accordance with one aspect of the present invention may be configured to provide actual time information or alternatively, provide elapsed time information from an arbitrary frame of reference depending upon the input command from the user under the control of controller 204.

Figure 3:
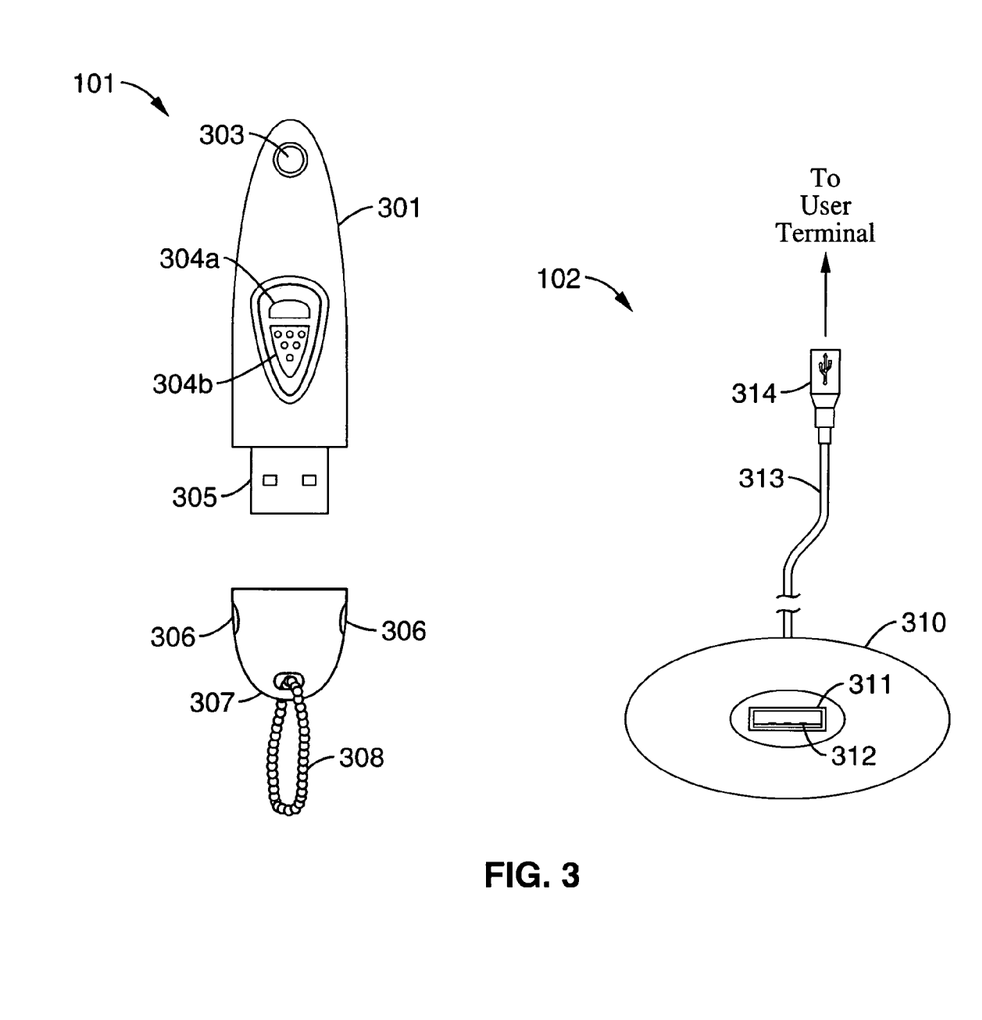
FIG. 3 illustrates an electronic data marker device and cradle-type docking connection of one embodiment.

FIG. 3 illustrates an electronic data marker device and cradle-type docking connection of one embodiment. Referring to FIG. 3, data marker device 101 includes a housing comprising body 301 and cap 302. Body 301 is provided with e-mark button 303 which is configured for user input commands. Also provided on body 301 are display panels 304a and 304b which are configured to display the number of user inputted e-marks and the type of registered broadcast station for the corresponding e-marks, respectively. Finally, body 301 includes communication port 305 such as a USB port which is integrated onto body 301 such that, as will be discussed in further detail below, body 301 may be placed on top of cradle type connection 102 with communication port 305 capable of being plugged into the corresponding port on cradle 102.

Cap 302 can be attached to body 301 when access to communication port 305 is unnecessary. As shown, cap 302 is provided with a pair of release/lock buttons 306 on either side of cap 302 such that by depressing release/lock buttons 306 when cap 302 is locked with body 301, cap 302 can be released from a locked position and communication port 305 may be accessed. Furthermore, cap 302 is provided with hole 307 substantially at its edge position such that link chain 308 can be looped through hole 307 to allow the user to attach the data marker device 101 to a key chain or the like.

Referring back to FIG. 3, cradle-type connection 102 is provided with cradle base 310 substantially flat on its bottom surface (not shown) to rest cradle 102 on a flat surface such as a desktop and a book shelf. On the other side of the bottom surface of cradle 102 is receiving section 311 substantially positioned on the middle of cradle 102, where communication port 312 such as a USB port is provided for connection to communication port 305 of the data marker device 101. Also shown in FIG. 3 is cable 313 attached to cradle connection 102 with a communication port 314 at its other end. In this manner, cradle 102 may be connected to user terminal 103 accessing the user's electronic music marker device account over an internet connection.

In one aspect, data marker device 101 may include an electronic music marker device which is configured to bookmark music clips while being broadcast over a registered radio or a television station, and to later recall the information related to the bookmarked music clip such as the name of the song, the artist, the album containing the song and so on. Using the electronic music marker device, a user may conveniently access the music clip information that the user listened to on the radio at a later time without the need to memorize or write down the information or wait hopefully for the disc jockey on the radio to provide that information, In this manner, if the user wants to, for example, purchase the music album which the user has marked using electronic music marker device, the user can easily identify the necessary information related to the marked music clip from the e-marks provided by the electronic music marker device.

Additional information relating to the operation of the electronic music marker device 101 may be found in pending application Ser. No. 09/126,007 filed on Jul. 29, 1998 and application Ser. No. 09/401,105 filed on Sep. 22, 1999, both assigned to Sony Corporation, joint-assignee of the present application with Sony Electronics, Inc., a subsidiary of Sony Corporation, the disclosures of each of which are herein incorporated in their entirely by reference for all purposes.

Figure 4:
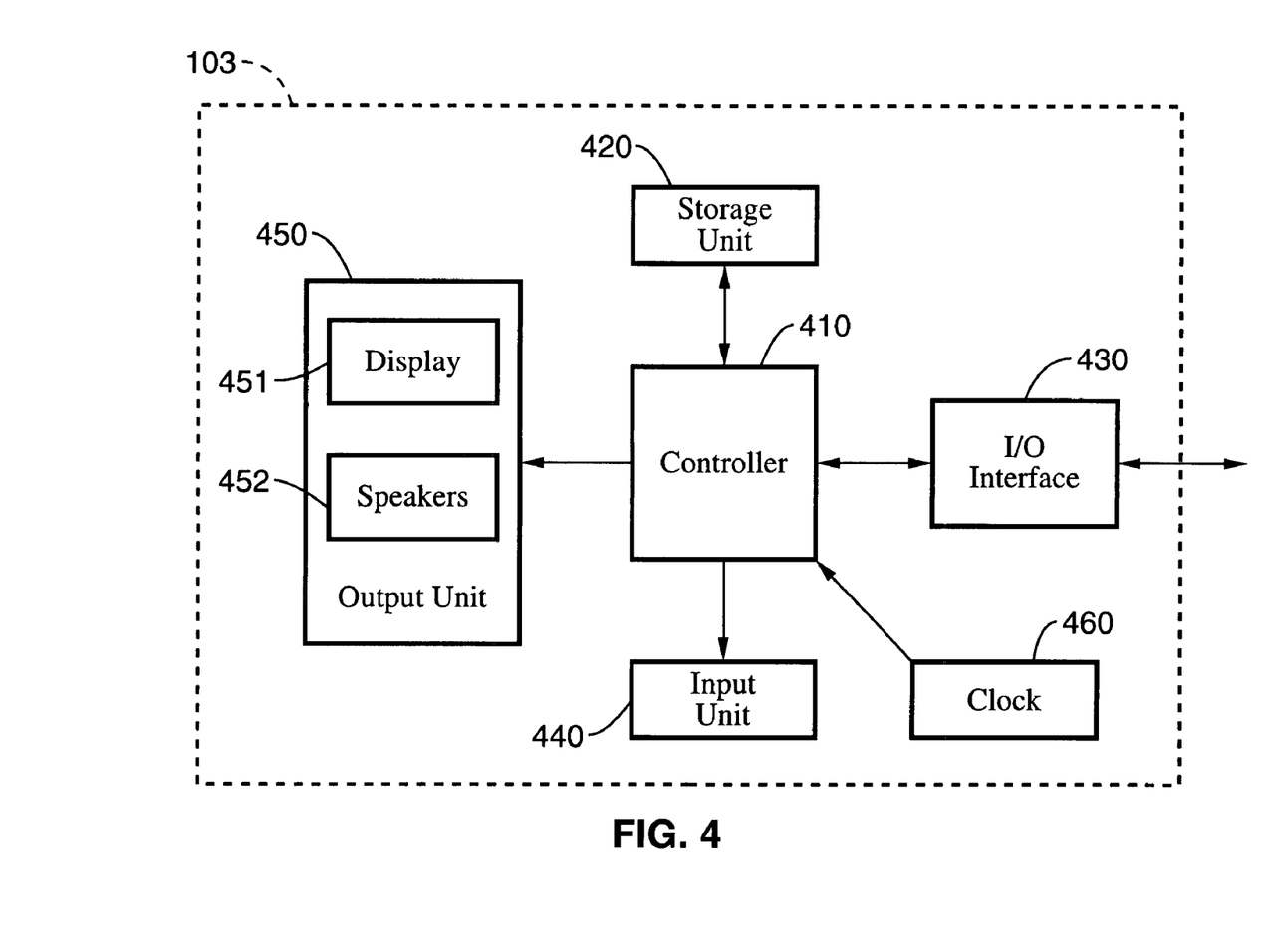
FIG. 4 illustrates one embodiment of user terminal 103 shown in FIG. 1.

FIG. 4 illustrates one embodiment of user terminal 103 shown in FIG. 1. Referring to FIG. 4, user terminal 103 (FIG. 1) in one embodiment may include controller 410, storage unit 420, I/O interface unit 430, input unit 440, output unit 450 and clock 460. Storage unit 420 of user terminal 103 may include one or more of an internal or an external storage device such as a hard disc drive (HDD), a CD-RW drive, or a zip drive. Input unit 440 of user terminal 103 may include one of or a combination of a keyboard, a mouse, a touchpad input device and a voice-recognition type input terminal including a microphone with corresponding software installed in user terminal 103 for performing input operations by voice commands.

Referring to FIG. 4, controller 410 is coupled to input unit 440 and accordingly, may be configured to process the input data received from input unit 440. Storage unit 420 is similarly coupled to controller 410, and may be configured to store inputted data received from input unit 440 or other data received by user terminal 103. Clock 460 also coupled to controller 410 may be configured to provide time information to controller 410 which, in turn, may be stored in storage unit 420 as discussed in further detail below.

Referring back to FIG. 4, I/O interface unit 430 in one embodiment may be coupled to controller 410, and may be configured to interface with other user terminals 103 in the network or to communicate with server terminal 105.

In one embodiment, I/O interface circuit 430 of user terminal 103 may include a communication port configured to connect to the date network 104 such as the internet via connections such as, but not limited to, a modem dial-up through an internet service provider (ISP), a DSL or cable modem-type connection, and a T1, IDSN or LAN type connection. Communication port integrated in I/O interface circuit 230 may include, among others, one of a USB port, a serial port, a parallel port, an IEEE 1394 communication port, a IrDA communication port, and a Bluetooth enabled communication port.

Referring again to FIG. 4, output unit 450 of user terminal 103 may include display unit 451 and speakers 452. Display unit 451 may be configured to output text, image (for example, in .jpg or .gif formats) or video data (for example, in .avi or .mpeg formats) while speakers may be configured to output sound data in the form of, for example, .wav file format. In this manner, user terminal 103 in one embodiment may be configured to communicate with server terminal 105 over data network 104.

Figure 5:
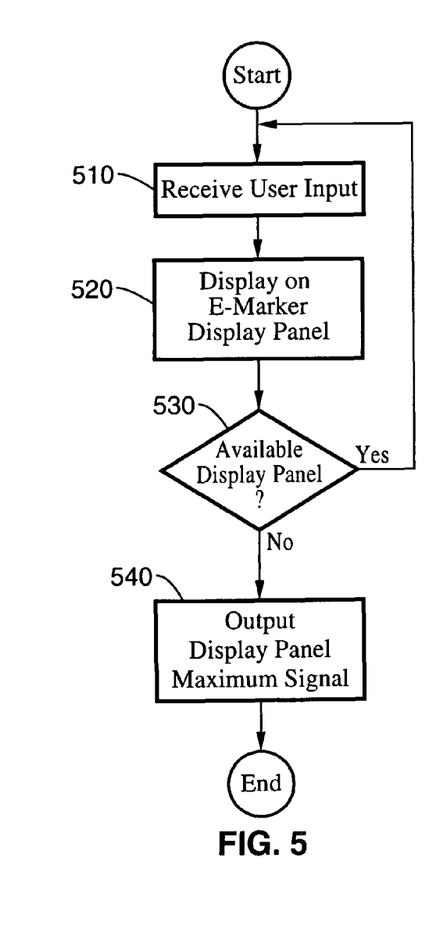
FIG. 5 is a flowchart for illustrating one embodiment of the electronic data marker device operation.

FIG. 5 is a flowchart for illustrating one embodiment of the electronic data marker device operation. Referring to FIG. 5, at step 510, electronic data marker device 101 detects user's input operation of e-mark buttons 203a, 203b. Then, at step 520, data marker device 101 illuminates or flashes a corresponding e-mark display panel 304a, 304b. As discussed above, in one embodiment, the corresponding e-mark display panel 304a, 304b may be configured to display time and/or date information of the user's input operation of e-mark buttons 203a, 203b.

At step 530, data marker 101 determines whether all available e-mark display panels 304a, 304b are being used (for example, illuminated or flashing in response to user input operation of e-mark button 203a, 203b). If it is determined that there are e-mark display panels 304a, 304b available, data marker device 101 waits for further input operation by the user at step 510. On the other hand, if it is determined at step 530 that all available e-mark display panels 304a, 304b are in use, then at step 540, electronic data marker device 101 generates an output signal to inform the user that data marker device 101 has reached its maximum number of e-marks that it can handle, and the procedure ends. In one embodiment, the output signal from data marker device 101 to inform the user that it has reached its maximum number of e-marks it can handle may be an audible output signal such as an audible tone via an audio output terminal (not shown). Alternatively, data marker device 101 may be configured to flash all e-mark display panels 203a, 203b simultaneously for a predetermined period of time to visually indicate to the user that it has reached its maximum number of e-marks that it can handle.

Figure 6:
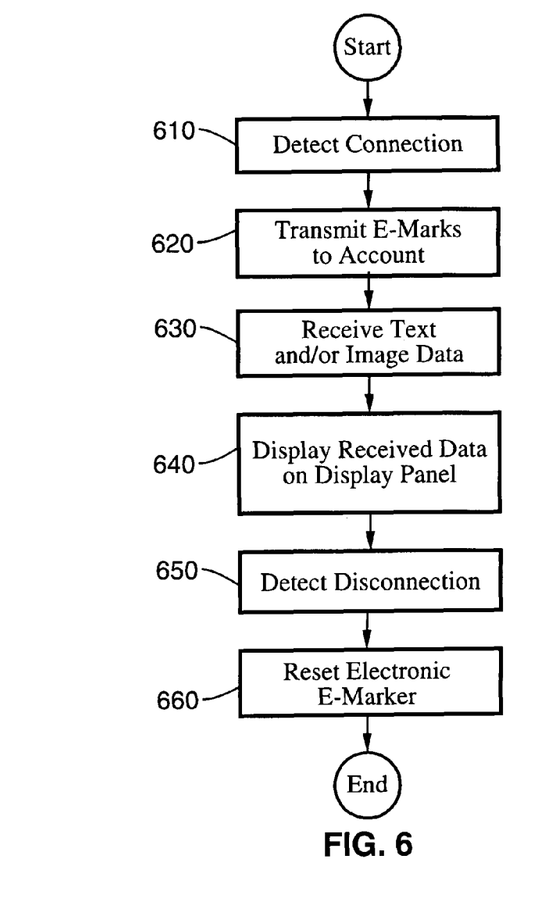
FIG. 6 is a flowchart for illustrating one embodiment of downloading data from the user's electronic music marker device account to the data marker device.

FIG. 6 is a flowchart for illustrating one embodiment of downloading data from the user's electronic music marker device account to the data marker device. Referring to FIG. 6, at step 610, data marker device 101 detects a connection to user terminal 103 connected to the internet. After the user enters the user's account information and performs necessary electronic music marker device account access steps at user terminal 103, at step 620, data corresponding to the e-marks (bookmarks) stored in data marker device 101 is transmitted to the user's electronic music marker device account via gateway (user) terminal 103, and in response, the corresponding text and/or image (including video) data are retrieved from server terminal 105 of, for example, emarker.com web site and transmitted to the user's electronic music marker device account. Then, at step 630, the text and/or image data corresponding to each e-mark are downloaded onto data marker device 101. At step 640, the downloaded text and/or image data are displayed on each corresponding e-mark display panel 304a, 304b on data marker device 101.

When the user disconnects data marker device 101 from user terminal 103, the termination is detected at step 650, and at step 660, data marker device 101 is reset such that previously stored e-marks inputted by the user may be erased from the storage unit of data marker device 101, and correspondingly, the illuminated e-mark display panels 304a, 304b are turned off. The user may then operate e-mark button 203a, 203b again to input additional bookmarks of events such as music clip broadcasts from registered radio and television broadcast stations.

Figure 7:
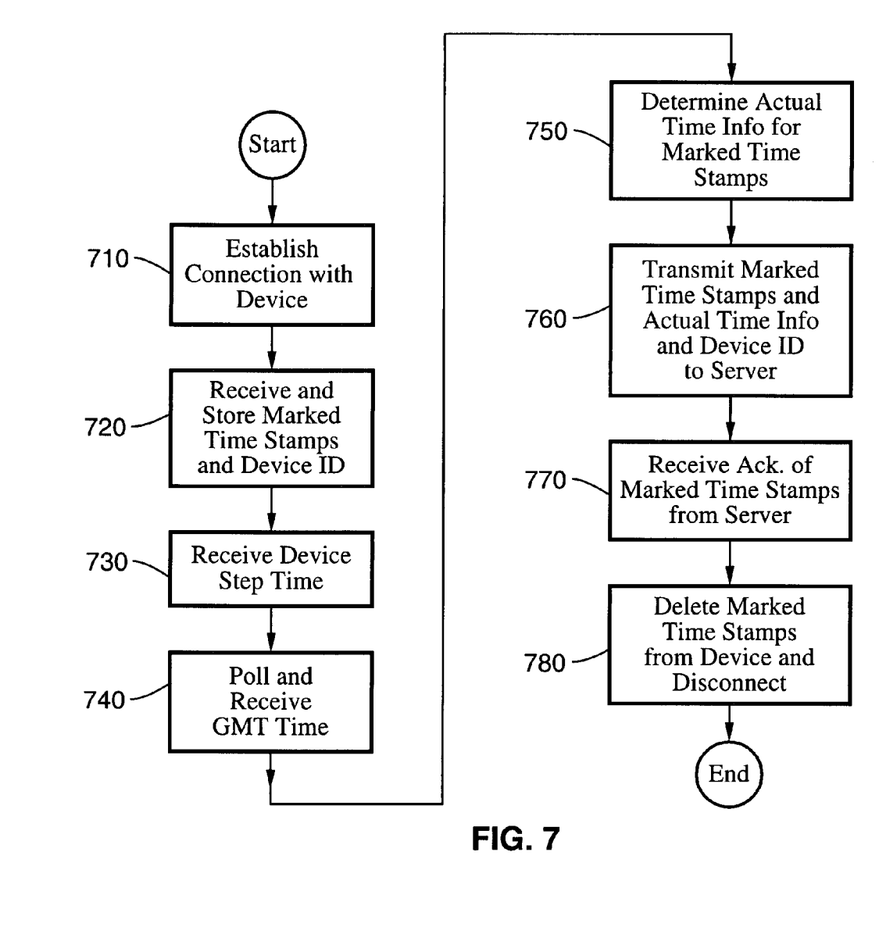
FIG. 7 is a flowchart for illustrating the data marker device driver processing of the user terminal in one embodiment.

FIG. 7 is a flowchart for illustrating the data marker device driver processing of the user terminal in one embodiment. Referring to FIG. 7, at step 710, a connection between data marker device 101 and user terminal 103 is established using, for example, a USB cable connection and the like as discussed above. Thereafter, at step 720, data marker device 101 is configured to transmit the stored time stamps that the user of the device has bookmarked as well as the unique device identification code from its memory (e.g., EEPROM) to user terminal 103. In one aspect, each marked time stamp includes timing information based on device clock 460 internal to data marker device 101, and may be in the format of, for example, an arbitrary running clock measured in seconds such as 411,124 seconds representing an elapsed time of 114.2 hours.

Referring back to FIG. 7, at step 730, device stop time is received from data marker device 101 which represents the reference point for device clock 460 used to determine the actual time corresponding to each marked time stamp received from device 101 as discussed in further detail below. For instance, the device stop time may be in the format of the arbitrary running clock measures in seconds similar to the marked time stamps, and may be represented as, for example, 412,579 seconds. Thereafter at step 740, user terminal 103 polls server terminal 105 via a connection through data network 104 to request and receive real time information (based on, for example, GMT), from server terminal 105, corresponding to the device stop time received at step 730.

Referring again to FIG. 7, at step 750, user terminal 103 determines the actual real time information for each marked time stamp based on the real time information received from server terminal 105, time stamp information corresponding to each marked time stamp received from data marker device 101, and the stop time information received from device 101. For example, to determine the actual time for each marked time stamp, in one aspect, the time elapsed from the marked time stamp to the device stop time may be subtracted from the real time information received from server terminal 105 which represents the real time corresponding to the device stop time. Thus, for example, by subtracting the marked time stamp of 411,124 seconds (for the example above) from the device stop time of 412,579 seconds (resulting in 1,455 seconds), and subtracting this amount from the real time corresponding to the device stop time, the actual time information for each marked time stamp marked by data marker device 101 may be determined.

Referring again to FIG. 7, at step 760, the actual time information corresponding to each marked time stamp, as well as device ID information and the number of marked time stamps are transmitted to server terminal 105. Upon receipt, server terminal 105 may be configured to transmit a receipt acknowledgement signal to user terminal 103 at step 770 confirming the receipt of the data transmitted from user terminal 103. Thereafter at step 780, user terminal 103 may be configured to delete the marked time stamps stored in data marker device 101 and to disconnect or power off the device. Data marker device 101 may then be disconnected from user terminal 103 and the user may input additional time stamp marks in the manner described above.

Figure 8:
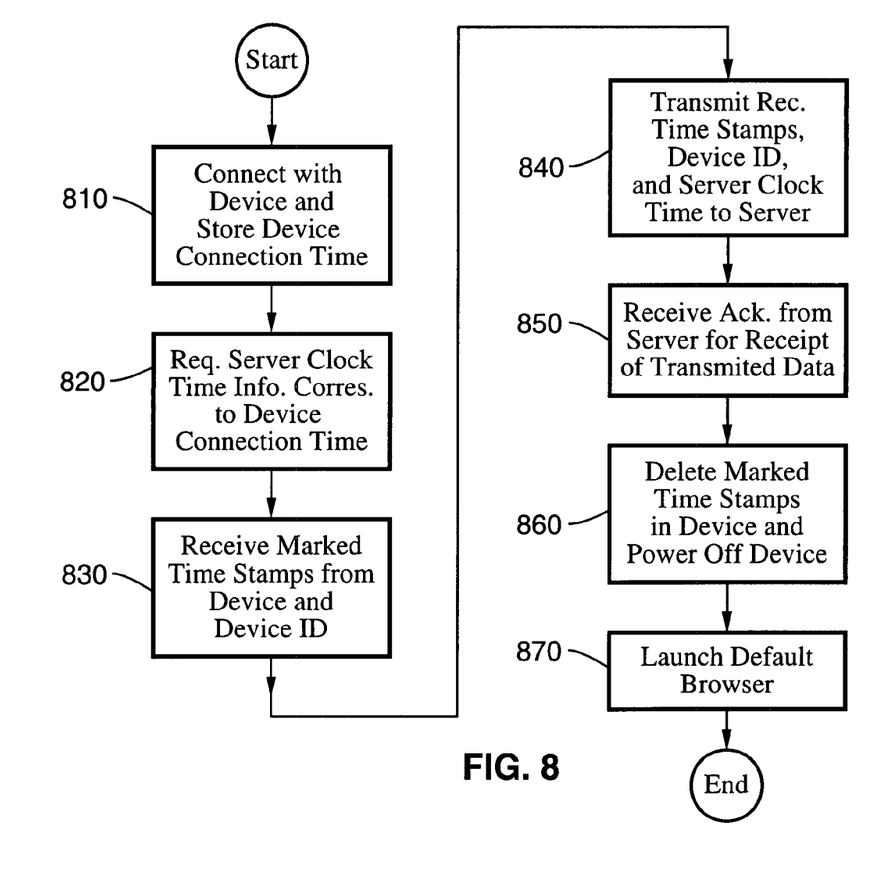
FIG. 8 is a flowchart for illustrating the data marker device driver processing of the user terminal in another embodiment.

FIG. 8 is a flowchart for illustrating the data marker device driver processing of the user terminal in another embodiment. Referring to FIG. 8, at step 810 a connection is established between data marker device 101 and user terminal 103 in a similar manner as described above at step 710 of FIG. 7. At step 820, user terminal 103 transmits a request to server terminal 105 for server clock time information (e.g., based on GMT) which corresponds to the time at which data marker device 101's connection to user terminal 103 is established. In this manner, the time at which data marker device 101 is connected to user terminal 103 may be determined based on server terminal 105 clock and accordingly, synchronized therewith.

Referring back to FIG. 8, at step 830, marked time stamps and the data marker device unique identification code is received by user terminal 103. Thereafter at step 840, user terminal 103 is configured to transmit the received marked time stamps, device identification code, and server clock time information reflecting the real time at which connection between device 101 and user terminal 103 is established, to server terminal 105 via data network 104 under a connection protocol such as TCP/IP or wireless application protocol in the case of wireless connection between user terminal 103 and server terminal 105. Server terminal 105 is then configured to determine the real time for each marked time stamp received from user terminal 103 in the manner similar to step 750 of FIG. 7 above (where the determination of real time corresponding to each marked time stamp was determined by user terminal).

Upon receiving the marked time stamps, device identification code, and server clock time information from user terminal 103, server terminal 105 is configured to transmit a receipt acknowledgement signal at step 850 back to user terminal 103 confirming receipt of the transmission. After receiving the receipt acknowledgement signal from server terminal 105, user terminal 103 may be configured to delete the stored marked time stamps in data marking device 101 and thereafter to power off device 101 to preserve its battery life. Referring again to FIG. 8, at step 870, user terminal 103 is configured to launch default internet browser on display unit 451 of user terminal 103 such that the user may view information corresponding to the marked time stamps received from server terminal 105.

In one aspect, clock 206 of data marker device 101 may be configured to begin its clock function upon being powered up initially by a battery and the like. Thereafter, clock 206 may be configured to continuously run in one second increments until a predetermined maximum time has reached. In one embodiment, the predetermined maximum time for clock 206 may be 10,000 hours. Alternatively, clock 206 may be configured to initialize its one-second increment counter upon completion of each connection process with user terminal 103 such that clock 206 is configured to run from zero each time data marker device 101 is disconnected from user terminal 103.

As discussed above, in accordance with various embodiments, a plurality of time specific events may be recorded or "stamped" using data marker device 101 such that the user may conveniently recall information corresponding to the stamped time specific events at a later point in time without the need to recall the information from memory or to write it down each time a desired time specific event occurs.

For example, in the case of music broadcasts from radio and television stations, often the name of the music clip being broadcast or the name of the artist of the music clip, for example, is of interest to the listeners. However, at the time of the music clip broadcast, it is not always the case that the broadcasting station informs the listener of the information such as the name of the music clip or the artist during the music clip broadcast. Moreover, even when the broadcasting station provides the name of the music clip being broadcast or the name of the album or artist for the music clip, listeners may not necessarily remember that information at a later point in time, for example, when the listener wishes to purchase the music clip which was heard over the broadcasting station.

Accordingly, data marker device 101 provides a simple and effective approach to store data such as time stamps which may be correlated with a broadcast music clip that the user is interested in, and the information corresponding to the stamped music clip may be conveniently retrieved from server terminal maintained by the data marker device provider such as emarker.com. Indeed, by maintaining playlist information for broadcasts from registered radio and television stations, server terminal may be configured to determine the broadcast music clips corresponding to the user's time stamps and transmit information related to the marked (or stamped) music clips to the user terminal. Furthermore, given the compact size of the data marker device, it can be conveniently attached to the user's keychain or the like for easy and ready access thereto. Additionally, with the internal clock of the data marker device capable of running up to 10,000 hours (over 410 days), device users may retrieve the information corresponding to marked time stamps long after the time stamps are marked in the device without being concerned about losing the stored information (i.e., the marked time stamps).

While one example related to marking or stamping broadcast music clips is discussed above, in accordance with the various embodiments, other time specific events may be marked for later retrieval using the data marker device. For example, television program broadcasts, advertisements for products and/or services broadcast over radio or television stations, or even those advertisements that are placed along side highways on billboards. Indeed, using the geographic information corresponding to the data marker device for a particular user and the corresponding device identification code, and provided that the server terminal maintains a database or has access to information related to the placement of the advertisements, using the data marker device, the user may conveniently retrieve information corresponding to the marked time stamps whether it is related to a broadcast music clip or a television program, or the underlying product or service for a broadcast advertisement.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A system for identifying a time specific event, comprising:
    a data marker device configured to store one or more time stamps, as the only event identifiers stored during a time specific event, responsive to a user input operation, the data marker device storing a device identification code;
    wherein said time stamps and said device identification code are the only data stored within the data marker device to identify a time-specific event;
    wherein said data marker device is configured for communicating said time stamps and an identification code over a data network;
    a server terminal configured for operating over the data network to generate a reference time information;
    a user terminal configured for operating over the data network to receive said one or more time stamps and the device identification code from the data marker device at a stop time, and further, to receive the reference time information from the server terminal and to determine a time information corresponding to each of the one or more time stamps by subtracting time elapsed from the marked time stamps from the device stop time and subtracting this amount from the reference time value received from the server;
    wherein the reference time information corresponds to a time point when the data marker device establishes connection with the user terminal; and
    a server configured for maintaining playlist information which contains event times;
    wherein said user terminal is configured to access a user device account through which the user retrieves information for events from said playlists whose timestamps were stored in the data marker device.

2. The system of claim 1:
    wherein the data marker device includes a clock; and
    wherein each of the one or more time stamps corresponds to a respective signal from the clock.

3. The system of claim 2 wherein the clock is configured to increment in a one-second interval.

4. The system of claim 1 wherein the device identification code includes one of a predetermined length numeric sequence, a predetermined length letter sequence, and a predetermined length combination of numeric and letter sequence.

5. The system of claim 1 wherein the data marker device stores time stamps based on an arbitrary running clock.

6. The system of claim 1 wherein the reference time information provides real time information.

7. The system of claim 1 wherein the connection between the data marker device and the user terminal includes one of a USB connection, a parallel connection, a serial connection, an IrDA connection and a Bluetooth connection.

8. The system of claim 1 wherein the user terminal is further configured to transmit a request signal to the server terminal when the data marker device establishes the connection with the user terminal.

9. The system of claim 8 wherein the server terminal is configured to transmit the reference time information to the user terminal in response to the request signal received from the user terminal.

10. The system of claim 1 wherein the user terminal is further configured to generate a time information corresponding to the each one or more time stamps based on the reference time information.

11. The system of claim 1 wherein the user terminal is further configured to transmit the number of time stamps, the device identification code and the time information corresponding to each of the one or more time stamps to the server terminal.

12. The system of claim 11 wherein the user terminal is further configured to receive a receipt acknowledgement signal from the server terminal upon termination of transmission.

13. The system of claim 12 wherein the user terminal is further configured to erase the time stamps stored in the data marker device after receiving the receipt acknowledgement signal.

14. The system of claim 13 wherein the user terminal is further configured to power off the data marker device.

15. The system of claim 1 wherein the server terminal is configured to transmit the reference time information in response to a request signal received from the user terminal.

16. The system of claim 15 wherein the user terminal is further configured to transmit the number of time stamps, the device identification code, and the time information corresponding to each of said one or more time stamps to the server terminal.

17. The system of claim 16 wherein the user terminal is further configured to receive a receipt acknowledgement signal from the server terminal upon completing the transmission.

18. The system of claim 17 wherein the user terminal is further configured to erase the time stamps stored in the data marker device after receiving the receipt acknowledgement signal.

19. The system of claim 18 wherein the user terminal is further configured to power off the data marker device.

20. The system of claim 1 wherein the user terminal includes one of a personal computer, an internet access enabled personal digital assistant, a Wireless Application Protocol enabled mobile telephone, and an i-mode enabled mobile telephone.

21. The system of claim 1 wherein the data network includes one of a Local Area Network (LAN), a Wide Area Network (WAN), and an internet connection.

22. The system of claim 1 wherein the server terminal and the user terminal are coupled to the data network using one of a TCP/IP protocol and a wireless application protocol.

23. The system of claim 1:
    wherein the user terminal includes an output unit; and
    wherein the user terminal is further configured to launch an internet browser for display in the output unit.

24. The system as recited in claim 1, wherein said server maintains a database or has access to information related to the placement of the time specific events selected from the group of time specific events consisting of broadcast music clips, television programs, or underlying products or services for broadcast advertisements.

25. The system as recited in claim 24, wherein using said data marker device, a user may conveniently retrieve information corresponding to said one or more time stamps whether they are related to broadcast music clips, television programs, or underlying products or services for broadcast advertisements.

26. The system as recited in claim 24, wherein said playlist includes event information, including geographic location of registered radio stations, associated with said event times which are accessible to said user when retrieving information which identifies a time specific event associated with said one or more time stamps.

27. A method of identifying physical events registered as time stamps in a data marker device, comprising:
   storing one or more time stamps, as the only event identifiers stored during a physical event, within a data marker device storing a device identification code;
   wherein said time stamps and said device identification code are the only data stored within the data marker device to identify a physical event;
   receiving the data marker device identification code from the data marker device;
   transmitting a request for a reference time information to a server configured to provide a real time reference;
   receiving the reference time information based on the transmitting step;
   determining a time information corresponding to each of the one or more time stamps computed based on the reference time information received; and
   transmitting the number of time stamps, the data marker device identification code, and time information only, corresponding to each of the one or more time stamps, to a user device account;
   maintaining playlist information on a server which contains broadcast times; and
   retrieving event information for physical events from said playlist information based on data from said user device account.

28. The method of claim 27 further comprising establishing a connection using a data transfer protocol.

29. The method of claim 27 wherein the determining step includes comparing reference time information to each of the one or more time stamps, and generating the time information based on the comparing step.

30. The method of claim 27 further comprising receiving a receipt acknowledgement signal after the data transmitting step.

31. The method of claim 30 further comprising erasing the time stamps from the data marker device.

32. The method of claim 31 further comprising powering off the data marker device.

33. The method of claim 27 further comprising displaying an internet browser.

34. The system as recited in claim 27, wherein said maintaining of playlist information includes maintaining information on the geographic location of registered radio stations associated with said events which is accessible to said user when retrieving event information corresponding to said one or more time stamps.

35. The method as recited in claim 34, wherein using said data marker device, a user may conveniently retrieve information corresponding to said one or more time stamps whether they are related to broadcast music clips, television programs, or underlying products or services for broadcast advertisements.

36. The method as recited in claim 27, wherein said server maintains a database or has access to information related to physical events selected from the group of events consisting of broadcast music clips, television programs, or underlying products or services for broadcast advertisements.

37. A system for identifying a time specific event, comprising:
   means for storing one or more time stamps, as the only event identifiers stored during a time specific event, within a portable device storing a device identification code;
   wherein said time stamps and said device identification code are the only data stored within the portable device to identify a time-specific event;
   means for generating a reference time information;
   means for receiving the one or more time stamps and the device identification code, and the reference time information;
   means for determining real time information corresponding to each of said one or more time stamps;
   means for maintaining playlist information on a server which contains event times; and
   means for retrieving information which identifies a time specific event from said playlist information in response to said real time information and said device identification code stored in said portable device by said means for storing.

38. The method as recited in claim 37, wherein using said one or more time stamps which were stored on said portable device, a user can conveniently retrieve event information corresponding to said one or more time stamps selected from the group of time specific events consisting of broadcast music clips, television programs, or underlying products or services for broadcast advertisements.

39. The method as recited in claim 37, wherein said server maintains said playlist information in a database or has access to information related to the placement of the time specific events selected from the group of time specific events consisting of broadcast music clips, television programs, or underlying products or services for broadcast advertisements.

40. The system as recited in claim 37, wherein said playlist includes event information, including geographic location of registered radio stations, associated with said event times which are accessible to said user when retrieving information which identifies a time specific event associated with said one or more time stamps.

* * * * *